United States Patent [19]

Bott

[11] Patent Number: 4,903,876

[45] Date of Patent: Feb. 27, 1990

[54] ARTICLE CARRIER

[76] Inventor: John A. Bott, 931 Lakeshore Dr., Grosse Pointe Shores, Mich. 48236

[21] Appl. No.: 207,063

[22] Filed: Jun. 13, 1988

[51] Int. Cl.$^4$ .......................... B60R 9/04; B61D 45/00
[52] U.S. Cl. .................................... 224/321; 224/324; 224/326; 410/107
[58] Field of Search ............... 224/321, 323, 324–327, 224/309, 310, 317, 331, 42.45 A; 410/58, 69, 70, 96, 101, 107, 111, 112, 113; 296/37.1, 37.5–37.7

[56] References Cited

U.S. PATENT DOCUMENTS

| | | | |
|---|---|---|---|
| 1,923,785 | 8/1933 | Holan | 410/69 |
| 3,542,264 | 11/1970 | Meyer | 224/326 |
| 4,531,869 | 7/1985 | Hemmings | 410/107 |

Primary Examiner—Henry J. Recla
Assistant Examiner—J. Casimer Jacyna
Attorney, Agent, or Firm—Harness, Dickey, Pierce

[57] ABSTRACT

The present invention is an article securing assembly for receiving a device to secure an object on a plurality of elongated slats mounted on an exterior horizontal surface of an automobile. The assembly includes a cavity in at least one of the slats. A tie-down member is disposed within the cavity for pivotal movement between a closed position in which the upper surface of the tie-down member does not extend above the upper surface of the slat and an open position such that a portion of the tie-down member extends above the upper surface of the slat.

11 Claims, 3 Drawing Sheets

ARTICLE CARRIER

BACKGROUND OF THE INVENTION

1. Field of the Invention

The present invention relates to an article carrier for automotive vehicles, more particularly to, a tie-down assembly for an article carrier on an automotive vehicle.

2. Description of Related Art

Automobile luggage racks frequently employ two separate sub assemblies or portions: a rectangular framework which surrounds the load to be carried and a plurality of slats which rest on the roof or other automobile roof or other body surface and carry the weight of the load. In such constructions, the framework and the slats are often secured to the automobile body independently of one another or the slats are connected to the body through the framework by means of special cross straps. In still another luggage or article carrier, the means for confining the luggage and supporting its weight are formed into one unitary welded tubular assembly.

Some luggage racks or article carriers have been designed to be secured on an automobile body by flexible straps or the like and are relatively easily removable from the automobile. Such carriers, however, have not enjoyed great popularity. They have generally been quite unsightly and their bulk and weight have made their removal and storage rather difficult. Accordingly, most automobile owners desiring a luggage rack have favored the type of luggage rack which is permanently mounted on the vehicle.

In my prior U.S. Pat. No. 4,182,471, I disclosed a luggage carrier having slats which are decorative in appearance and perform the usual slat functions of reinforcing the roof, trunk lid or other body surface on which they are mounted and holding luggage or other objects to be carried out of contact with the painted finish of the automobile. Special end caps were used to cover up the end of the slats and incorporated eyelets by which straps or ropes could be attached to the automobile for tying down luggage. This construction has achieved significant commercial success. Nevertheless, some problems have been experienced in presenting a more aesthetically appealing tie-down member which is not visible above the surface of the slat when it is not in use. It is believed that a need exists for a tie-down member which has that attractive appearance.

SUMMARY OF THE INVENTION

The present invention is an article securing assembly for receiving a device to secure an object on a plurality of elongated slats mounted on an exterior horizontal surface of an automobile. The assembly includes means forming a cavity in one of the slats. A securing means is disposed within the cavity for pivotal movement between a closed position in which the upper surface of the securing means does not extend above the upper surface of the slat and an open position such that a portion of the securing means extends above the upper surface of the slat.

Among the objects of the present invention are the provision of an article carrier for an automobile in which the tie-down member is not visible above the surface of the slat when not in use. It is another object of the present invention to provide a more aesthetically appealing tie-down member.

DESCRIPTION OF THE PREFERRED EMBODIMENT

Figure 1:
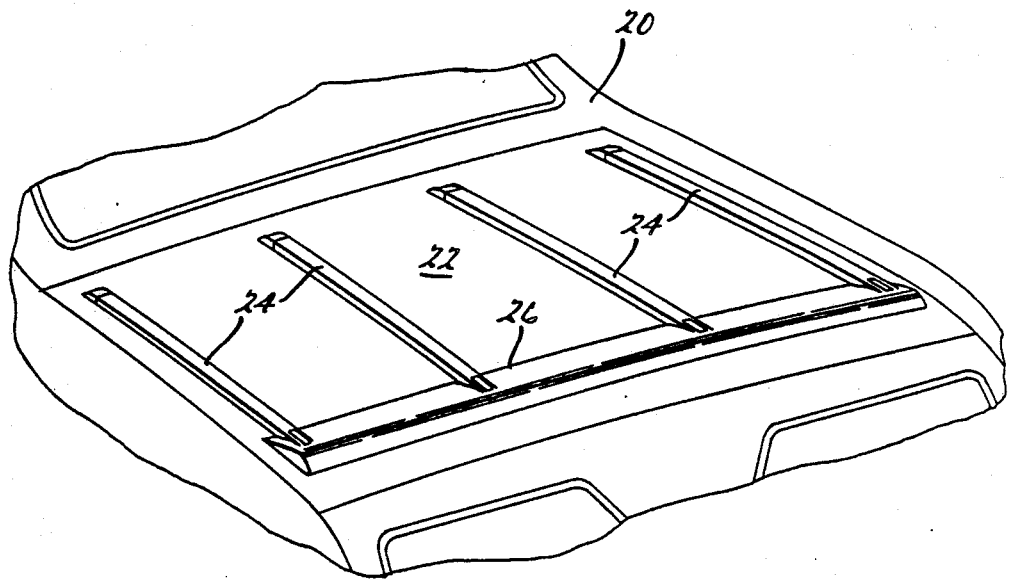
FIG. 1 is a fragmentary perspective view of an automobile showing an article carrier mounted thereon which is constructed in accordance with the principles of the present invention.

FIG. 1 depicts an automobile 20 having a trunk lid 22 on which are mounted a plurality of identical, parallel, transversely spaced slats 24. Although the slats 24 are shown mounted on the trunk lid 22, the article carrier of the present invention may be mounted with equal utility on an automobile roof or any other generally horizontal exterior body portion of an automobile. A tubular member 26 such as a spoiler is mounted at one end of the slats 24 on the trunk lid 22 and is generally perpendicular to the slats 24.

Figure 2:
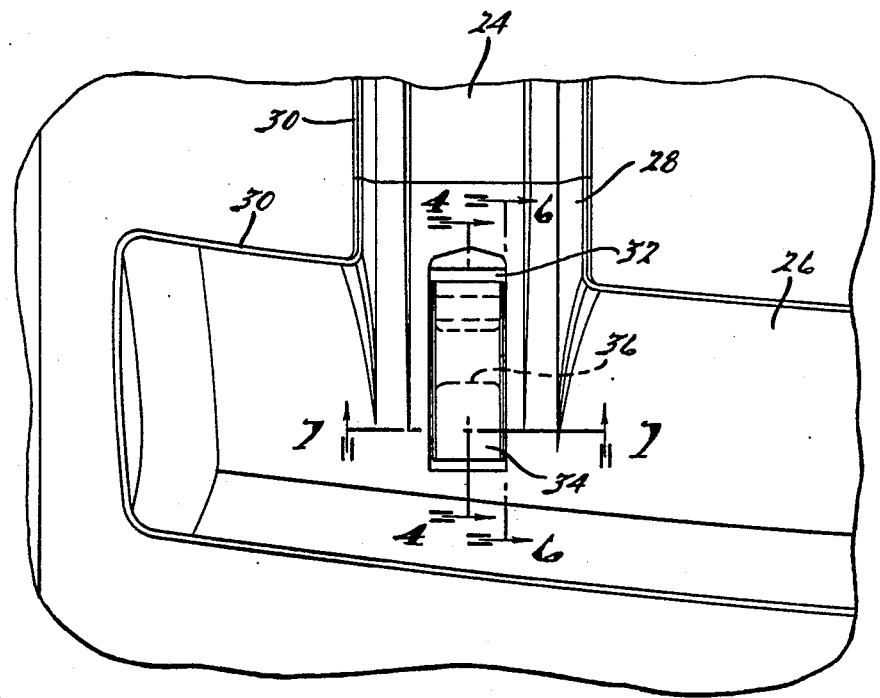
FIG. 2 is an enlarged plan view of a portion of the structure illustrated in FIG. 1.

Referring to FIG. 2, the tubular member 26 includes a plurality of identical, parallel, transversely spaced extensions 28 for cooperating with one end of corresponding slats 24. Interposed between the slats 24, tubular member 26 and the trunk lid 22 are elastomeric mounting pads 30 on which flat bottom surfaces of the slats 24 and tubular member 26 rest. The slats 24 and tubular member 26 are secured on the trunk lid 22 by means of sheet metal screws (not shown) which also pass through the mounting pads 30.

Figure 3:
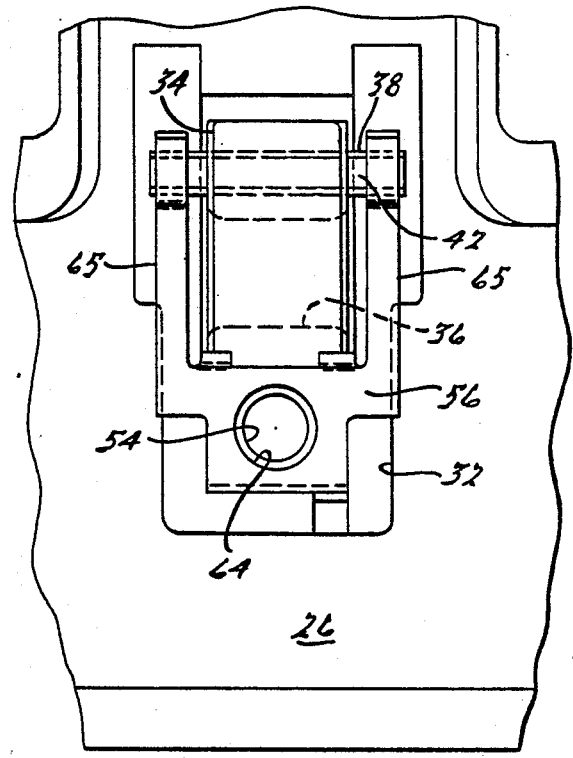
FIG. 3 is a bottom view of the portion of the structure illustrated in FIG. 2.
Figure 4:
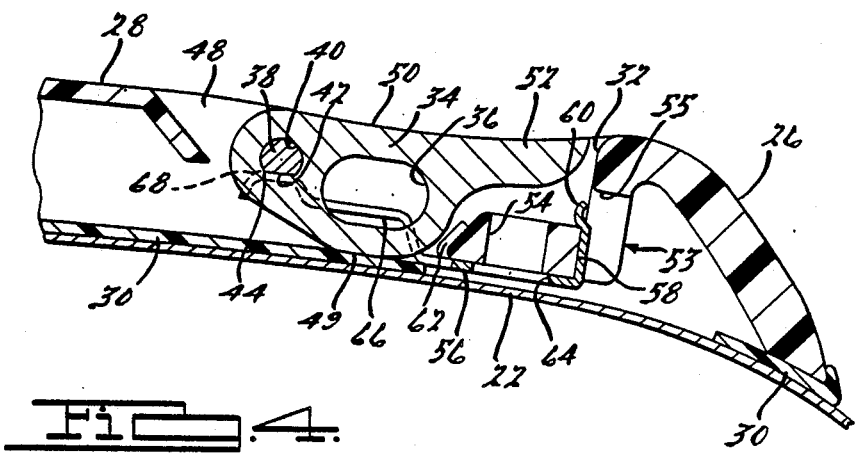
FIG. 4 is a sectional view of the structure illustrated in FIG. 2 taken along line 4—4 thereof with a tie-down member in the closed position.
Figure 6:
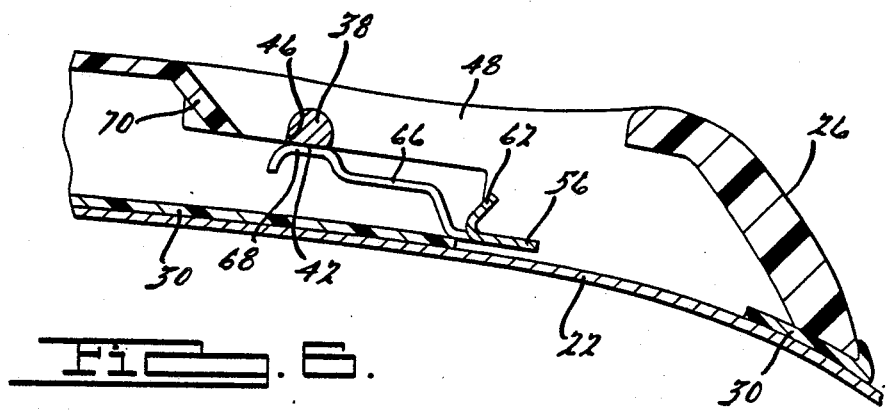
FIG. 6 is a sectional view of the structure illustrated in FIG. 2 taken along line 6—6 thereof.

Each of the extensions 28 include means forming a cavity 32. A tie-down member 34 is disposed in the cavity 32 and has an eyelet 36 for reception of a rope, strap or other device to tie-down an object such as luggage on the slats 24. Referring to FIGS. 3 and 4, the tie-down member 34 is pivotally supported upon a shaft member 38 for rotation about an axis passing longitudinally through the shaft member 38. The shaft member 38 passes through an aperture 40 in the tie-down member 34. The shaft member 38 is generally circular and includes a flat 42 which cooperates with a corresponding flat portion 44 of the aperture 40 to allow the shaft member 38 and tie-down member 34 to move as an integral unit. Referring to FIG. 6, the shaft member 38 is journally supported in apertures 46 of side walls 48 forming the cavity 32. The apertures 46 are oversized to allow rotation of the shaft member 38 about its axis.

Figure 7:
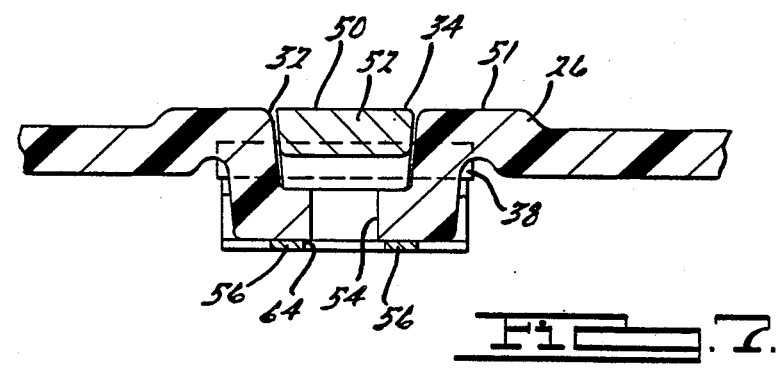
FIG. 7 is a sectional view of the structure illustrated in FIG. 2 taken along line 7—7 thereof.

Referring to FIG. 4, the tie-down member 34 is generally elliptical in cross-section and includes a flat portion 49 which cooperates with a portion of the mounting pad 30 to allow the top surface 50 of the tie-down member 34 to follow the contour of the upper surface of tubular member 26. As illustrated in FIG. 7, the top surface 50 of the tie-down member 34 is flush with the upper surface 51 of the extension 28 when the tie-down member 34 is in the closed position as shown in the figure. In the closed position, the tie-down member 34 is not visible above the upper surface 51 to present a more aesthetically appealing appearance. The tie-down member 34 also includes an extension or handle member 52 for allowing a person to grasp the tie-down member 34 to move it between its closed and opened positions shown in FIGS. 4 and 5, respectively.

Referring to FIG. 4, the tubular member 26 includes an L-shaped portion 53 forming a portion of the cavity 32. The L-shaped portion 53 includes a generally horizontal portion forming a first aperture 54 which is generally circular in shape to allow a means such as a fastener (not shown) to pass through the aperture 54 and secure the L-shaped portion 53 to the trunk lid 22. The L-shaped portion 53 also includes a generally vertical portion forming a second aperture 55 which is perpendicular to the first aperture 54. A spring member 56 cooperates with the shaft member 38 and is disposed about the horizontal portion of the L-shaped portion 53. The spring member 56 includes a first or rear flange 58 which is disposed in the second aperture 55 about one end of the horizontal portion. The rear flange 58 includes an opposite outwardly extending detent 60 to retain the flange 58 about the rear end of the horizontal portion. The spring member 56 includes a second or front flange 62 which is generally inclined and complementary to the inclined surface of the front end of the horizontal portion. The front flange 62 is disposed partially about the front end of the horizontal portion to retain the spring member 56 to the horizontal portion. The flanges 58 and 62 releaseably retain the spring member 56 to the L-shaped portion 53 and prevent radial or longitudinal movement of the rear portion of the spring member 56 relative to the tubular member 26. The spring member 56 also includes an a aperture 64 in alignment with the first aperture 54 of the L-shaped portion 53 to allow a fastener to pass through.

Referring to FIG. 3, the spring member 56 includes parallel, transversely spaced arm members 65. The arm members 65 cooperate or contact the shaft member 38 on a portion between the tie-down member 34 and the side walls of the cavity 32. Referring to FIGS. 4 and 6, the arm members 65 include a first stepped portion 66 which extends radially outwardly relative to the trunk lid 22. A second stepped portion 68 is connected to one end of the first stepped portion 66 and extends radially outwardly relative to the trunk lid 22. The second stepped portion 66 cooperates with the flat 42 on the shaft member 38 to secure or bias the tie-down member 34 in the closed position shown in FIG. 4.

Figure 5:
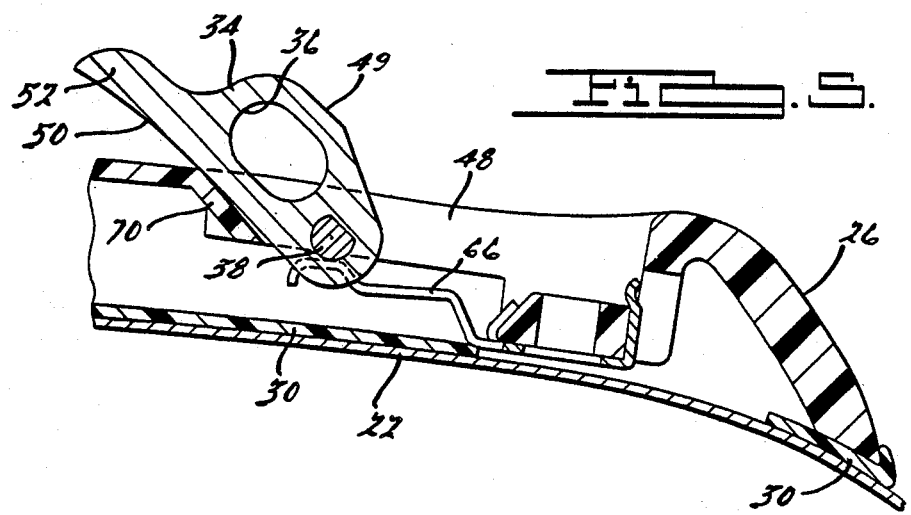
FIG. 5 is a sectional view of the structure illustrated in FIG. 4 with the tie-down member in the open position.

Referring to FIG. 5, when the tie-down member 34 is manually rotated to the open position shown in the figure, a force is exerted to overcome the spring force of spring member 56. When this occurs, the circular portion of the shaft member 38 deflects the second stepped portion 68 of the spring member 56 downwardly or radially inwardly toward the trunk lid 22 to allow rotation of the tie-down member 34. A stop flange 70 on the extension 28 extends downwardly or inwardly at an angle toward the trunk lid 22 and acts as a stop to limit the rotation of the tie-down member 34 as shown in the figure. Thus, the present invention provides a tie-down member 34 which can be disposed flush or hidden within either the slat 24 or tubular member 26 in the closed or stowed position and flipped-up to an open or operative position by overcoming the spring force biasing the tie-down member 34 in the closed position.

The present invention has been described in an illustrative manner. It is to be understood that the terminology which has been used is intended to be in the nature of words of description rather than of limitation.

Obviously, many modifications and variations of the present invention are possible in light of the above teachings. Therefore, the present invention may be practiced otherwise than as specifically described.

What is claimed is:

1. An article securing assembly for receiving a device to secure an object on a plurality of elongated slats mounted on an exterior horizontal surface of an automobile, said assembly comprising:

means forming a cavity in one of the slats and having a first upper surface;

securing means adapted for receiving a device to secure an object on the slats, said securing means being disposed within said cavity and having a second upper surface, said securing means being adapted for pivotal movement between a closed position in which the second upper surface of said securing means does not extend above the first upper surface of the slat and an open position such that a portion of the securing means extends above the first upper surface of the slat; and pivot means for allowing pivotal movement of said securing means between said open and closed positions, said pivot means including a flat circumferential portion;

biasing means for biasing said securing means in said closed position;

said biasing means comprising a spring disposed within said cavity and having a pair of laterally spaced and longitudinally extending arms for cooperating with said flat circumferential portion of said pivot means when said securing means is in its closed position to bias said securing means in said closed position.

2. An assembly as set forth in claim 1 wherein said securing means comprises a tie-down member having an eyelet adapted to receive a device to tie-down an object on the slats.

3. An assembly as set forth in claim 2 wherein said pivot means comprises a shaft member secured within said cavity, said tie-down member being disposed about said shaft member.

4. An assembly as set forth in claim 3 wherein said shaft member has an arcuate circumferential portion and said flat circumferential portion.

5. An assembly as set forth in claim 4 wherein said spring includes retaining means for retaining said spring to the slat.

6. An assembly as set forth in claim 5 including stop means for limiting the rotation of said tie-down member.

7. An assembly as set forth in claim 6 wherein said stop means comprises a flange extending inwardly at an angle into said cavity.

8. An assembly as set forth in claim 7 wherein each of said arms includes a first stepped portion extending radially outwardly and a second stepped portion at one end of said first stepped portion and extending radially outwardly to cooperate with said flat circumferential portion of said shaft member.

9. An assembly as set forth in claim 8 wherein said tie-down member includes means forming an aperture complementary to the circumferential shape of said shaft member for allowing said shaft member and said tie-down member to rotate as an integral unit.

10. An assembly as set forth in claim 9 wherein said aperture has an arcuate circumferential portion and a flat circumferential portion.

11. An article carrier for an automobile including a plurality of parallel slats fixedly secured on a generally horizontally exterior automobile body surface;
  a tubular member extending transversely to said slats and having a plurality of extensions, each of which cooperating with one end of each of said slats and fixedly secured to the automobile body surface;
  means forming a cavity in at least one of said extensions;
  securing means for receiving a device to secure an object on a plurality of slats and being disposed within said cavity for pivotal movement between a closed position in which the upper surface of said securing means does not extend above the upper surface of said extension and an open position such that a portion of the securing means extends above the upper surface of said extension;
  said securing means comprises a tie-down member having an eyelet adapted to receive a device to tie-down an object on the slats;
  pivot means for allowing pivotal movement of the tie-down member between said open and closed position;
  said pivot means comprises a shaft member secured within said cavity, said tie-down member being disposed about said shaft member;
  biasing means for biasing said tie-down member in said closed position;
  said shaft member has an accurate circumferential portion and a flat circumferential portion;
  said biasing means comprises a spring disposed within said cavity and having a pair of laterally spaced arms for cooperating with said flat circumferential portion of said shaft member;
  said spring includes retaining means for retaining said spring to the slat;
  stop means for limiting the rotation of said tie-down member;
  said stop means comprises a flange extending inwardly at an angle into said cavity;
  each of said arms includes a first stepped portion extending radially outwardly and a second stepped portion at one end of said first stepped portion and extending radially outwardly to cooperate with said flat circumferential portion of said shaft member when said securing means is in its closed position to bias said securing means in said closed position; and
  said tie-down member includes means forming an aperture complementary to the circumferential shape of said shaft member for allowing said shaft member and said tie-down member to rotate as an integral unit.

* * * * *

UNITED STATES PATENT AND TRADEMARK OFFICE
CERTIFICATE OF CORRECTION

PATENT NO. : 4,903,876

DATED : February 27, 1990

INVENTOR(S) : John A. Bott

It is certified that error appears in the above-identified patent and that said Letters Patent is hereby corrected as shown below:

Title page:

Under References Cited add --4,358,037, 11/9/82, Heidman--

Under References Cited add --4,460,116, 7/17/84, Bott--

Column 1, Line 11, "sub assemblies" should be --subassemblies--

Column 1, Line 19, after "another" insert --automobile--

Column 3, Line 36, delete "a" after --an--

Column 4, Line 50, Claim 4, "said" should be --a--

Signed and Sealed this

First Day of October, 1991

Attest:

HARRY F. MANBECK, JR.

Attesting Officer

Commissioner of Patents and Trademarks